United States Patent [19]
Bubenik et al.

[11] Patent Number: 5,933,429
[45] Date of Patent: Aug. 3, 1999

[54] MULTIPOINT-TO-MULTIPOINT ECHO PROCESSING IN A NETWORK SWITCH

[75] Inventors: Richard G. Bubenik, St. Louis, Mo.; Stephen A. Caldara, Sudbury, Mass.; Stephen A. Hauser, Burlington, Mass.; Thomas A. Manning, Northboro, Mass.; Stephen R. Veit, Black Jack, Mo.

[73] Assignees: Fujitsu Network Communications, Inc., Richardson, Tex.; Fujitsu Limited, Kawasaki, Japan

[21] Appl. No.: 08/827,932

[22] Filed: Apr. 29, 1997

Related U.S. Application Data

[63] Continuation of application No. 08/683,335, Jul. 18, 1996, abandoned.
[60] Provisional application No. 60/001,498, Jul. 19, 1995.

[51] Int. Cl.[6] .................................................. H04L 12/56
[52] U.S. Cl. .......................................... 370/392; 370/413
[58] Field of Search .................................. 370/389, 390, 370/392, 395, 396, 397, 398, 399, 412, 413, 414, 415, 416, 417, 418, 419; 340/826, 825.07, 825.5, 825.51

[56] References Cited

U.S. PATENT DOCUMENTS

| 3,804,991 | 4/1974 | Hammond et al. | 179/26 |
|---|---|---|---|
| 3,974,343 | 8/1976 | Cheney et al. | 179/18 ES |
| 4,069,399 | 1/1978 | Barrett et al. | 179/15 AL |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |
| 4,872,160 | 10/1989 | Hemmady et al. | 370/60 |
| 4,878,216 | 10/1989 | Yunoki | 370/60 |

(List continued on next page.)

FOREIGN PATENT DOCUMENTS 484943  3/1992  Japan .

OTHER PUBLICATIONS

H.T. Kung and K. Chang, *Receiver–Oriented Adaptive Buffer Allocation in a Credit–Based Flow Control for ATM Networks*, Proceedings of INFOCOM '95, Apr. 2–6, 1995, pp. 1–14.

H.T. Kung et al., *Credit–Based Flow Control for ATM Networks: Credit Update Protocol, Adaptive Credit Allocation and Statistical Multiplexing*, Proceedings of ACM SIG-COMM '94 Symposium on Communications Architectures, Protocols and Applications, Aug. 31–Sep. 2, 1994, pp. 1–14.

(List continued on next page.)

*Primary Examiner*—Chi H. Pham
*Assistant Examiner*—Ricky Q. Ngo
*Attorney, Agent, or Firm*—Weingarten, Schurgin, Gagnebin & Hayes LLP

[57] ABSTRACT

An apparatus and a method are disclosed for unencumbering valuable switching resources in a network switch involved in a multipoint-to-multipoint switching scenario. The network switch includes an input processing port that is connected to a plurality of input links, and an output processing port that is connected to a plurality of output links. A data cell received on an input link is processed by the input processing port by appending a link number, a port number, and a connection identification code associated with the input processing port to the data cell. The data cell is then transferred to the output processing port where it is processed by comparing the appended link number, port number, and connection identification code with those associated with the output processing port. The data cell is then stored in a data buffering queue in the output processing port according to a matching scheme.

9 Claims, 8 Drawing Sheets

U.S. PATENT DOCUMENTS

| | | | |
|---|---|---|---|
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/650 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 385/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 395/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 6/1994 | Proctor et al. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 4/1994 | Faulk, Jr. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,365,514 | 11/1994 | Hershey et al. | 370/17 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/390 |
| 5,412,648 | 5/1995 | Fan | 370/60 |
| 5,416,703 | 5/1995 | Sakaue et al. | 370/60 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/390 |

| | | | |
|---|---|---|---|
| 5,440,547 | 8/1995 | Easki et al. ................................ 370/60 |
| 5,444,702 | 8/1995 | Burnett et al. ........................ 370/60.1 |
| 5,446,733 | 8/1995 | Tsuruoka ............................... 370/60.1 |
| 5,446,737 | 8/1995 | Cidon et al. ........................... 370/85.5 |
| 5,446,738 | 8/1995 | Kim et al. .............................. 370/94.2 |
| 5,448,559 | 9/1995 | Hayter et al. ......................... 370/60.1 |
| 5,450,406 | 9/1995 | Esaki et al. ............................ 370/60.1 |
| 5,452,296 | 9/1995 | Shimizu ................................. 370/60.1 |
| 5,455,820 | 10/1995 | Yamada .................................... 370/17 |
| 5,455,825 | 10/1995 | Lauer et al. ............................ 370/390 |
| 5,457,687 | 10/1995 | Newman ................................ 370/85.3 |
| 5,459,743 | 10/1995 | Fukuda et al. ......................... 371/67.1 |
| 5,461,611 | 10/1995 | Drake, Jr. et al. ....................... 370/54 |
| 5,463,620 | 10/1995 | Sriram ..................................... 370/60 |
| 5,465,331 | 11/1995 | Yang et al. ........................ 395/200.08 |
| 5,475,679 | 12/1995 | Munter ................................. 370/60.1 |
| 5,479,401 | 12/1995 | Bitz et al. .............................. 370/60.1 |
| 5,479,402 | 12/1995 | Hata et al. ............................. 370/60.1 |
| 5,483,526 | 1/1996 | Ben-Nun et al. ..................... 370/60.1 |
| 5,485,453 | 1/1996 | Wahlman et al. ...................... 370/16 |
| 5,485,455 | 1/1996 | Dobbins et al. ......................... 370/60 |
| 5,487,063 | 1/1996 | Kakuma et al. ......................... 370/56 |
| 5,488,606 | 1/1996 | Kakuma et al. ......................... 370/16 |
| 5,491,691 | 2/1996 | Shrayer et al. .......................... 370/61 |
| 5,491,694 | 2/1996 | Oliver et al. ........................... 370/85.4 |
| 5,493,566 | 2/1996 | Ljungberg et al. ...................... 370/60 |
| 5,497,369 | 3/1996 | Wainwright ........................... 370/390 |
| 5,499,238 | 3/1996 | Shon ...................................... 370/60.2 |
| 5,504,741 | 4/1996 | Yamanaka et al. .................... 870/58.2 |
| 5,504,742 | 4/1996 | Kakuma et al. ....................... 370/60.1 |
| 5,506,834 | 4/1996 | Sekihata et al. .......................... 370/17 |
| 5,506,839 | 4/1996 | Hatta ........................................ 370/60 |
| 5,506,956 | 4/1996 | Cohen ................................ 395/182.04 |
| 5,509,001 | 4/1996 | Tachibana et al. ....................... 370/17 |
| 5,509,007 | 4/1996 | Takashima et al. ................... 370/60.1 |
| 5,513,134 | 4/1996 | Cooperman et al. .................... 365/49 |
| 5,513,178 | 4/1996 | Tanaka .................................. 370/58.2 |
| 5,513,180 | 4/1996 | Miyake et al. ......................... 370/60.1 |
| 5,515,359 | 5/1996 | Zheng ...................................... 370/13 |
| 5,517,495 | 5/1996 | Lund et al. ............................... 370/60 |
| 5,519,690 | 5/1996 | Suzuka et al. ........................... 370/17 |
| 5,521,905 | 5/1996 | Oda et al. ................................. 370/17 |
| 5,521,915 | 5/1996 | Dieudonne et al. ................... 370/60.1 |
| 5,521,916 | 5/1996 | Choudhury et al. .................. 370/60.1 |
| 5,521,917 | 5/1996 | Watanabe et al. .......................... 370/1 |
| 5,521,923 | 5/1996 | Willmann et al. .................... 370/94.1 |
| 5,523,999 | 6/1996 | Takano et al. ......................... 370/58.2 |
| 5,524,113 | 6/1996 | Gaddis ................................... 370/60.1 |
| 5,526,344 | 6/1996 | Diaz et al. ................................ 370/16 |
| 5,528,588 | 6/1996 | Bennett et al. ........................... 370/60 |
| 5,528,590 | 6/1996 | Iidaka et al. ........................... 370/60.1 |
| 5,528,591 | 6/1996 | Lauer ....................................... 370/79 |
| 5,530,695 | 6/1996 | Dighe et al. .............................. 370/17 |
| 5,533,009 | 7/1996 | Chen ........................................ 370/17 |
| 5,533,020 | 7/1996 | Byrn et al. ............................. 370/60.1 |
| 5,535,196 | 7/1996 | Aihara et al. ............................ 370/60 |
| 5,535,197 | 7/1996 | Cotton ...................................... 370/60 |
| 5,537,394 | 7/1996 | Abe et al. ................................. 370/17 |
| 5,541,912 | 7/1996 | Choudhury et al. ..................... 370/17 |
| 5,544,168 | 8/1996 | Jeffrey et al. ......................... 370/60.1 |
| 5,544,169 | 8/1996 | Norizuki et al. ...................... 370/60.1 |
| 5,544,170 | 8/1996 | Kasahara ................................. 370/84 |
| 5,546,389 | 8/1996 | Wippenback et al. ................... 370/60 |
| 5,546,391 | 8/1996 | Hochschild et al. ..................... 370/60 |
| 5,546,392 | 8/1996 | Boal et al. ............................. 370/60.1 |
| 5,550,821 | 8/1996 | Akiyoshi ............................... 370/60.1 |
| 5,550,823 | 8/1996 | Irie et al. ............................... 370/60.1 |
| 5,553,057 | 9/1996 | Nakayama ............................... 370/13 |
| 5,553,068 | 9/1996 | Aso et al. ................................. 370/60 |
| 5,555,243 | 9/1996 | Kakuma et al. ....................... 370/58.2 |
| 5,555,265 | 9/1996 | Kakuma et al. .......................... 370/60 |
| 5,557,607 | 9/1996 | Holden .................................. 370/58.2 |
| 5,568,479 | 10/1996 | Watanabe et al. .................... 370/60.1 |
| 5,570,348 | 10/1996 | Holden .................................... 370/395 |
| 5,570,361 | 10/1996 | Norizuki et al. ...................... 370/60.1 |
| 5,570,362 | 10/1996 | Nishimura ............................. 370/60.1 |
| 5,572,522 | 11/1996 | Calamvokis et al. ................... 370/390 |
| 5,577,032 | 11/1996 | Sone et al. ............................. 370/58.3 |
| 5,577,035 | 11/1996 | Hayter et al. ........................... 370/390 |
| 5,583,857 | 12/1996 | Soumiya et al. ....................... 370/233 |
| 5,583,858 | 12/1996 | Hanaoka ................................. 370/392 |
| 5,583,861 | 12/1996 | Holden .................................... 370/395 |
| 5,590,132 | 12/1996 | Ishibashi et al. ....................... 370/236 |
| 5,602,829 | 2/1997 | Nie et al. ................................ 370/235 |
| 5,610,913 | 3/1997 | Tomonaga et al. .................... 370/219 |
| 5,623,405 | 4/1997 | Isono ...................................... 395/230 |
| 5,625,846 | 4/1997 | Kobayakawa et al. ................ 395/872 |
| 5,633,861 | 5/1997 | Hanson et al. ......................... 370/232 |

OTHER PUBLICATIONS

*Head of Line Arbitration in ATM Switches with Input–Output Buffering and Backpressure Control.* By Hosein F. Badran and H. T. Mouftah, GLOBECOM '91, pp. 0347–0351.

An Ascom Timeplex White Paper, *Meeting Critical Requirements with Scalable Enterprise Networking Solutions Based on a Unified ATM Foundation*, pp. 1–12, Apr. 1994.

Douglas H. Hunt, ATM Traffic Management –Another Perspective, Business Communications Review, Jul. 1994.

Richard Bubenik et al., *Leaf Initiated Join Extensions*, Technical Committee, Signalling Subworking Group, ATM Forum/94–0325RI, Jul. 1, 1994.

Douglas H. Hunt et al., *Flow Controlled Virtual Connections Proposal for ATM Traffic Management (Revision R2)*, Traffic Management Subworking Group, ATM_Forum/94–0632R2, Aug. 1994.

Flavio Bonomi et al., *The Rate–Based Flow Control Framework for the Available Bit Rate ATM Service*, IEEE Network, Mar./Apr. 1995, pp. 25–39.

R. Jain, Myths About Congestion Management in High Speed Networks, Internetworking Research and Experience, vol. 3, 101–113 (1992).

Douglas H. Hunt et al., *Credit–Based FCVC Proposal for ATM Traffic Management (Revision R1)*, ATM Forum Technical Committee Traffic Management Subworking Group, ATM_Forum/94–0168R1, Apr. 28, 1994.

Douglas H. Hunt et al., *Action Item Status for Credit–Based FCVC Proposal*, ATM Forum Technical Committee Traffic Management Subworking Group, ATM_Forum/94–0439, Apr. 28, 1994.

Timothy P. Donahue et al., *Arguments in Favor of Continuing Phase 1 as the Initial ATM Forum P–NNI Routing Protocol Implementation*, ATM Forum Technical Committee, ATM Forum/94–0460, Apr. 28, 1994.

Rob Coltun et al., *PRP: A–NNI Routing Protocol Proposal*, ATM Forum Technical Committee, ATM_Forum/94–0492, Apr. 28, 1994.

Richard Bubenik et al., *Requirements For Phase 2 Signaling Protocol*, ATM Forum Technical Committee, Signalling Subworking Group, ATM Forum 94–1078, Jan. 1, 1994.

SITA, ATM RFP: C–Overall Technical Requirements, Sep. 1994.

| OFFSET | 7 | 6 | 5 | 4 | 3 | 2 | 1 | 0 |
|---|---|---|---|---|---|---|---|---|
| 1 | GFC/VPI | | | | VPI | | | |
| 2 | VPI | | | | VCI | | | |
| 3 | VCI | | | | | | | |
| 4 | VCI | | | | PT | | | CLP |
| 5 | UDF (HEC) | | | | | | | |
| 6 | Payload 1 | | | | | | | |
| 7-52 | ⋮ | | | | | | | |
| 53 | Payload 48 | | | | | | | |

FIG. 4

| OFFSET | 31 30 29 28 27 26 25 24 | 23 22 21 20 19 18 17 16 | 15 14 13 12 11 10 9 8 | 7 6 5 4 3 | 2 1 | 0 |
|---|---|---|---|---|---|---|
| 0 | GFC or VPI | VPI | VCI | PT | | CLP |
| 1 | ATM Payload Byte 1 | ATM Payload Byte 2 | ATM Payload Byte 3 | ATM Payload Byte 4 | | |
| 2..12 | ATM Payload Byte 5..45 | ATM Payload Byte 6..46 | ATM Payload Byte 7..47 | ATM Payload Byte 8..48 | | |
| 13 | Conn ID / vcx / Ingress Link# | Ingress Port Number | Cell Code | CRC-10 | | |

62 — Conn ID / vcx / Ingress Link#
64 — Ingress Port Number
66 — Cell Code region

FIG. 5

| Enq | Deq | 31 30 29 28 | 27 | 26 | 25 | 24 | 23 22 21 20 19 18 17 16 | 15 14 13 12 | 11 10 9 8 7 6 5 4 | 3 2 1 0 |
|---|---|---|---|---|---|---|---|---|---|---|
| R | | V | TS | CM | BC | CC | | | Scheduling List Number | |
| R | | Credit Out Link | | | FD Offset | | Pool A | Pool B | Dyn BW Decr Threshold | N2 Credit Limit |
| R | | CS | Conn ID | | | | Congestion Threshold | | B Buffer Limit | |
| R/W | | Q State | | | | | A Buffer Limit / Aloc Credits | | B Buffer Counter | |
| R/W | | | | | | | A Buffer Counter | | | |
| | R/W | | | | | | | Cell Counter | Discarded Cells | |

| OFFSET | 31 30 29 | 28 | 27 | 26 25 24 23 22 21 20 | 19 | 18 | 17 | 16 15 14 13 12 11 10 9 | 8 | 7 6 5 4 3 2 1 0 |
|---|---|---|---|---|---|---|---|---|---|---|
| 0 | Conn ID | Echo | | List | CE | XE | FM | Dynamic Cell Limit | | Allocated Cell Limit |
| 1 | Q | | | A Credit Limit | | | | A Credit Count | PrfPri | |
| 2 | | | | D Credit Limit | | | | D Credit Count | DynPri | |
| 3 | XON Thr | TS | CC | | | | | Tx Count | | |
| 4 | | | | Queue Tail Pointer | | | | Dynamic Cell Count | X | Allocated Cell Count |
| 5 | TX | GX | PX | CX | GFC | | | VPI | | VCI |

FIG. 7

| Echo Value | Function |
|---|---|
| 00 | Echo – The cell is always enqueued. |
| 01 | No Echo – The cell is always enqueued unless it matches the Ingress Port, Ingress Link, and Conn ID. |
| 10 | Only Echo – The cell is only enqueued if it matches the Ingress Port, Ingress Link, and Conn ID. |
| 11 | Unused – The cell is never enqueued. |

MULTIPOINT-TO-MULTIPOINT ECHO PROCESSING IN A NETWORK SWITCH

CROSS-REFERENCE TO RELATED APPLICATIONS

This application is a continuation of application Ser. No. 08/683,335 filed Jul. 18, 1996 now abandoned.

A claim of priority is made to provisional application 60/001,498, entitled COMMUNICATION METHOD AND APPARATUS, filed Jul. 19, 1995.

FIELD OF THE INVENTION

The present invention is generally related to network switching and, more particularly, to an apparatus and a method for unencumbering valuable switching resources in a network switch involved a multipoint-to-multipoint switching scenario.

BACKGROUND OF THE INVENTION

Telecommunications networks such as asynchronous transfer mode (ATM) networks are used for the transfer of audio, video, and other data. ATM networks deliver data by routing data units such as ATM cells from a source to a destination through switches. Switches typically include multiple input/output (I/O) ports through which ATM cells are received and transmitted. The appropriate output port to which a received ATM cell is to be routed to and thereafter transmitted from is determined based upon an ATM cell header.

In a multipoint-to-multipoint switching scenario, ATM cells from a variety of sources are transferred from multiple input queues to multiple output queues within a switch. In such a scenario, it is often beneficial to eliminate duplicate processing of ATM cells or to otherwise prevent the flow of certain ATM cells through a switch by selectively screening ATM cells before allowing them to be transferred through the switch. By only allowing certain ATM cells to be transferred through the switch, valuable switching resources become unencumbered. Accordingly, it would be desirable to devise a scheme whereby valuable switching resources in a network switch may become unencumbered in a multipoint-to-multipoint switching scenario.

SUMMARY OF THE INVENTION

An apparatus and a method are disclosed for unencumbering valuable switching resources in a network switch involved a multipoint-to-multipoint switching scenario. The network switch includes a switch fabric, an input processing port connected between a plurality of input links and the switch fabric and having a plurality of data buffering queues, and an output processing port connected between the switch fabric and a plurality of output links and having a plurality of data buffering queues. All of the data buffering queues have a connection identification code, and the data buffering queues in the output processing port have a data cell processing code. The input processing port processes a data cell received on one of the input links by appending to the data cell a link number indicating the input link where the data cell arrived, a port number indicating the input processing port, and a connection identification code associated with a data buffering queue in the input processing port where the data cell will be buffered. The output processing port processes a data cell processed by the input processing port and transferred to the output processing port through the switch fabric by comparing the link number to a link number of a link connected to the output processing port, the port number to a port number of the output processing port, and the connection identification code to a connection identification code associated with a data buffering queue in the output processing port. The data cell is then stored in the data buffering queue in the output processing port according to a matching scheme between the link numbers, the port numbers, and the connection identification codes as dictated by the value of the data cell processing code.

For a first value of the data cell processing code, the output processing port matching scheme requires that the link numbers, the port numbers, and the connection identification codes match in order for the data cell to be stored in the data buffering queue in the output processing port. For a second value of the data cell processing code, the output processing port matching scheme requires that the link numbers, the port numbers, and the connection identification codes do not match in order for the data cell to be stored in the data buffering queue in the output processing port. This mechanism allows each output queue to receive a unique set of ATM cells from a variety of sources, wherein the ATM cells are transferred from multiple input queues to each output queue.

From the above descriptive summary it is apparent how the present invention apparatus can save valuable switching resources in a network switch.

Accordingly, the primary object of the present invention is to provide an apparatus and a method for unencumbering valuable switching resources in a network switch involved a multipoint-to-multipoint switching scenario.

The above-stated primary object, as well as other objects, features, and disadvantages, of the present invention will become readily apparent from the following detailed description which is to be read in conjunction with the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE PRESENT INVENTION

Figure 1:
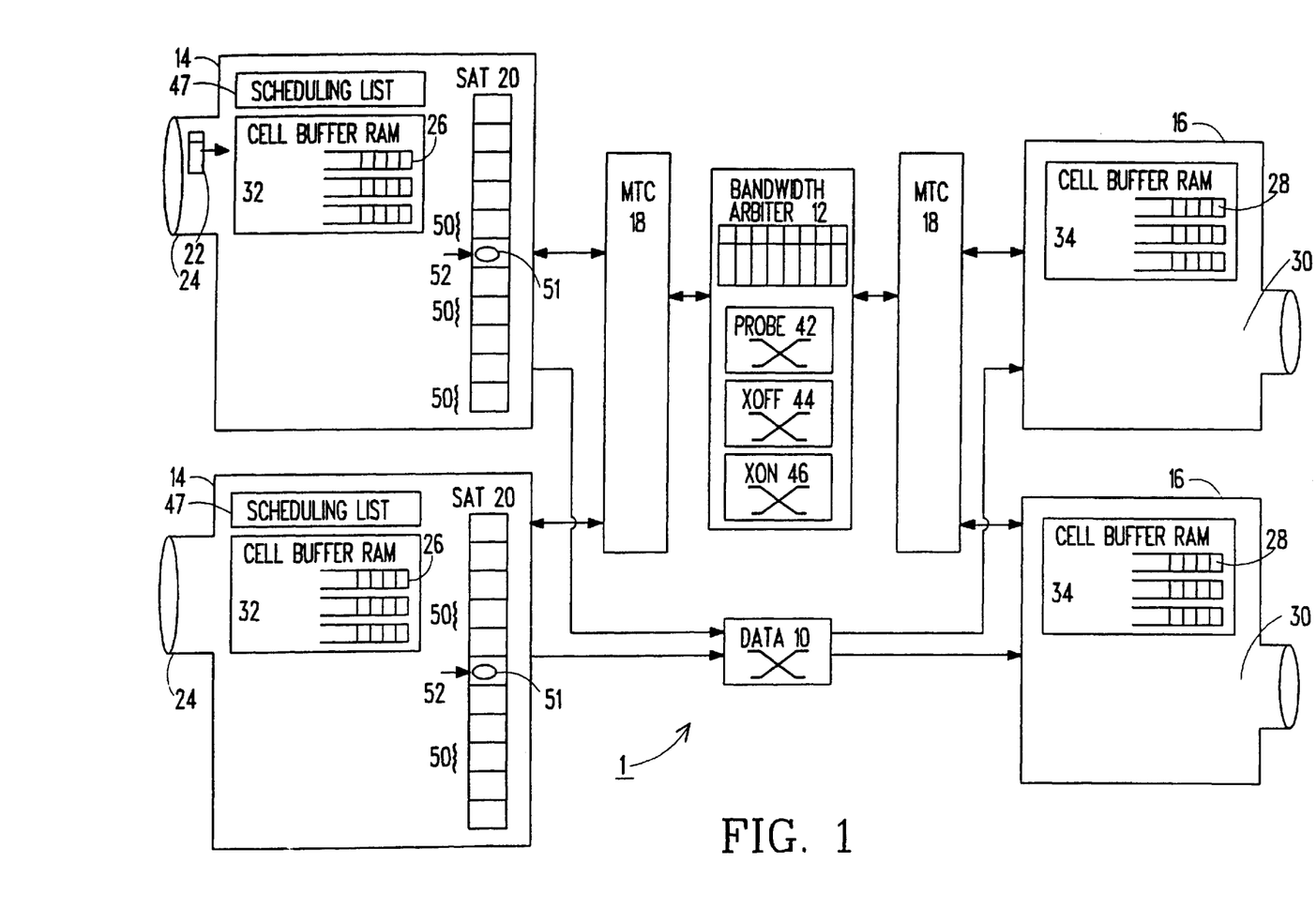
FIG. 1 is a block diagram of a network switch.

Referring to FIG. 1, there is shown a network switch 1 comprising a Data Crossbar 10, a Bandwidth Arbiter (BA) 12, a plurality of input port processors 14, a plurality of output port processors 16, and a plurality of Multipoint Topology Controllers (MTC) 18. The Data Crossbar 10, which may be an N×N crosspoint switch, is used for data cell transport and, in this particular embodiment, yields N×670

Mbps throughput. The BA 12 controls switch interconnections, dynamically schedules momentarily unused bandwidth, and resolves multipoint-to-point bandwidth contention. Each input port processor 14 schedules the transmission of data cells to the Data Crossbar 10 from multiple connections. Each output port processor 16 receives data cells from the Data Crossbar 10 and organizes those data cells onto output links.

In order to traverse the switch 1, a data cell 22 first enters the switch 1 on a link 24 to an input port processor 14 and is buffered in a queue 26 of input buffers. The data cell 22 is then transmitted from the queue 26 of input buffers through the Data Crossbar 10 to a queue 28 of output buffers in an output port processor 16. From the queue 28 of output buffers, the data cell 22 is transmitted onto a link 30 outside of the switch 1 to, for example, another switch.

To facilitate traversal of the switch 1, each input port processor 14 includes a cell buffer RAM 32 and each output port processor 16 includes a cell buffer RAM 34. The cell buffer RAM's 32 and 34 are organized into the respective input and output queues 26 and 28. All data cells 22 in a connection pass must through a unique input queue 26 and a unique output queue 28 for the life of the connection. The queues 26 and 28 thus preserve cell ordering. This strategy also allows quality of service ("QoS") guarantees on a per connection basis.

Three communication paths are used to facilitate traversal of the switch 1 via probe and feedback messages: a Probe Crossbar 42, an XOFF Crossbar 44, and an XON Crossbar 46. The Probe Crossbar 42, which in this particular embodiment is an N×N crosspoint switch, is used to transmit a multiqueue number from an MTC 18 to an output port processor 16. Each input port processor 14 includes a plurality of scheduling lists 47, each of which is a circular list containing input queue numbers for a particular connection. Each multiqueue number is derived from information provided to the MTC 18 from a scheduling list 47 in an input port processor 14. A multiqueue number identifies one or more output queues 28 to which a data cell may be transmitted when making a connection. An output port processor 16 uses the multiqueue number to direct a request message probe to the appropriate output queue or queues 28 and thereby determine if there are enough output buffers available in the output queue or queues 28 for the data cell.

The XOFF Crossbar 44, which in this particular embodiment is an N×N crosspoint switch, is used to communicate "DO NOT SEND" type feedback messages from an output port processor 16 to an input port processor 14. The XOFF feedback messages are asserted to halt the transmission of request message probes through the Probe Crossbar 42 from an input port processor 14 to an output port processor 16, and thus put a scheduling list 47 within the receiving input port processor 14 in an XOFF state, meaning that the scheduling list 47 cannot be used to provide a multiqueue number. The scheduling list 47 remains in an XOFF state until receiving an XON message from the output port processor 16, as described below. An input port processor 14 responds to an asserted XOFF feedback message by modifying XOFF state bits in a descriptor of the scheduling list 47. The XOFF state bits prevent the input port processor 14 from attempting to send a request message probe from the input port processor 14 to the output port processor 16 until notified by the output port processor 16 that output buffers are available for a corresponding connection.

The "DO NOT SEND" type feedback messages also halt the transmission of data cells from an input port processor 14 to an output port processor 16 when sufficient buffer space is not available to receive data cells in the output port processor 16. In such a case, an input port processor 14 will not transmit any data cells through the Data Crossbar 10. An idle cell, containing a complemented cyclic redundancy check (CRC) calculation, is transmitted instead.

The XON Crossbar 46, which in this particular embodiment is an N×N crosspoint switch, is used to communicate "ENABLE SEND" type feedback messages from an output port processor 16 to an input port processor 16. More particularly, the XON Crossbar 46 communicates an XON feedback message from an output port processor 16 to an input port processor 14. When an XOFF feedback message has been asserted by an output port processor 16 in response to a request probe message from an input port processor 14, the output port processor 16 sets a state bit in a queue descriptor of a corresponding output queue 28. When the number of data cells in that output queue 28 drops below an XON threshold, an XON message is sent from that output port processor 16 to the input port processor 14. The XON message enables the scheduling list 47 in the input port processor 14 to be used in the sending of request probe messages, and hence data cells.

The Probe & XOFF communication paths operate in a pipelined fashion. First, an input port processor 14 selects a scheduling list 47, and information associated with that scheduling list 47 is used to determine the output port processor 16, or the output queue 28, to which a data cell will be transmitted. More particularly, a multiqueue number, which is derived from information provided to an MTC 18 from a scheduling list 47 in an input port processor 14, is transmitted from the MTC 18 to one or more output port processors 16 using the Probe Crossbar 42. Each output port processor 16 then tests for buffer availability and asserts a "DO NOT SEND" type feedback message through the XOFF Crossbar 44 if output buffering is not available for that connection. If output buffering is available for that connection, the input port processor 14 transmits a data cell to one or more output queues 28 through the Data Crossbar 10.

Each input port processor 14 within the switch 1 also includes a Switch Allocation Table (SAT) 20 for mapping bandwidth allocation. SAT's 20 are the basic mechanism behind the scheduling of data cells. Each SAT 20 includes a plurality of sequentially ordered cell time slots 50 and a pointer 52 which is always directed to one of the cell time slots 50. All of the pointers 52 in the switch 1 are synchronized such that at any given point in time each of the pointers 52 is directed to the same cell time slot 50 in the respective SAT 20 with which the pointer 52 is associated, e.g., the first cell time slot. In operation, the pointers 52 are advanced in lock-step, with each cell time slot 50 being active for 32 clock cycles at 50 MHz. When a pointer 52 is directed toward a cell time slot 50, an input port processor 14 uses the corresponding entry 51 in the cell time slot 50 to obtain a data cell for launching into the Data Crossbar 10.

If valid, the contents of each SAT entry 51 point to a scheduling list 47. The contents of each (non-empty) entry in a scheduling list 47 consists of an input queue number. Each input queue number points to a input queue descriptor which contains state information that is specific to a particular connection. Each input queue descriptor, in turn, points to the head and the tail of a corresponding input queue 26, which contains data cells for transmission through the Data Crossbar 10.

If a SAT entry 51 does not contain a pointer to a scheduling list, i.e. the SAT entry 51 is set to zero, then the corresponding cell time slot 50 in the SAT 20 has not been allocated and that cell time slot 50 is available for dynamic bandwidth. Also, if a SAT entry 51 does contain a pointer to a scheduling list 47 but no input queue number is listed in scheduling list 47, then there are no data cells presently available for transmission and the corresponding cell time slot 50 is also available for dynamic bandwidth. Any bandwidth that has not been allocated is referred to as dynamic bandwidth, which is granted to certain types of connections by the BA 12 so as to increase the efficiency of the switch 1.

The switch 1 is configured to allow connections having different quality of service attributes to be managed in such a way that there is no interference between the characteristics of any connection with any other connection. In order to achieve this capability, an input port processor 14 manages each connection with a set of data structures that are unique for each connection.

Figure 2:
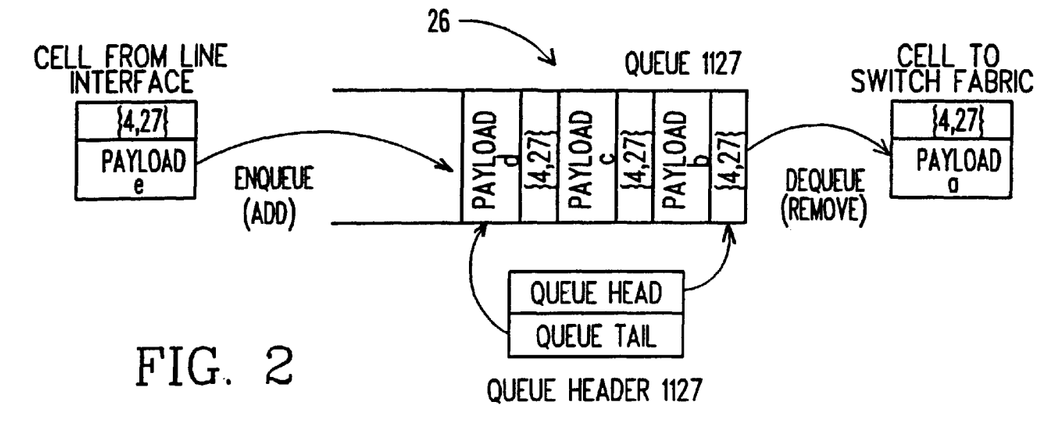
FIG. 2 illustrates the structure of an input queue.

There are two major data structures used by an input port processor 14 for managing different resources. One data structure is the input queue 26 and the other data structure is the scheduling list 47. In general, an input queue 26 is used to manage buffers. An input queue 26 consists of a group of one or more buffers organized as a FIFO and manipulated as a linked list structure using pointers. Incoming data cells 22 are added (enqueued) to the tail of an input queue 26. Data cells which are sent to the Data Crossbar 10 are removed (dequeued) from the head of an input queue 26. The ordering of data cells is always maintained. For a given connection, the sequence of data cells that are sent to the Data Crossbar 10 is identical to that in which they arrived at an input port processor 14, although the time interval between departing data cells may be different than the time interval between arriving data cells. FIG. 2 illustrates the structure of an input queue 26.

Figure 3:
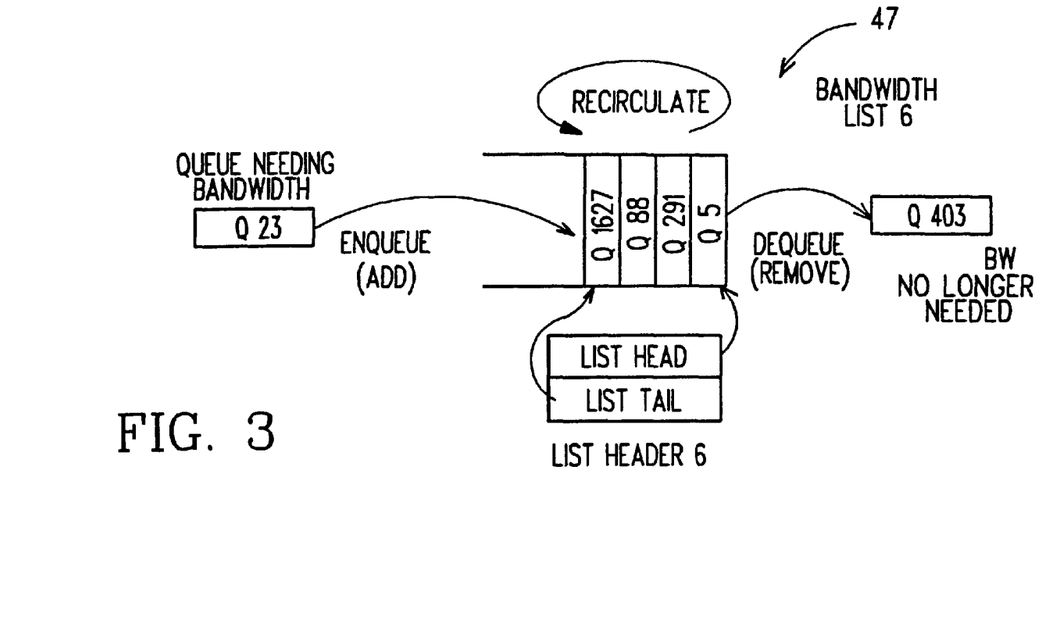
FIG. 3 illustrates the structure of a scheduling list.

A scheduling list 47 is used to manage bandwidth. A scheduling list 47 consists of one or more input queue numbers organized as a circular list. As with input queues 26, scheduling lists 47 are manipulated as a linked list structure using pointers. Input queue numbers are added to the tail of a scheduling list 47 and removed from the head of a scheduling list 47. An input queue number can only appear once on any given scheduling list 47. In addition to being added and removed, input queue numbers can be recirculated on a scheduling list 47 by removing the input queue number from the head of the scheduling list 47 and then adding the removed input queue number back onto the tail of the scheduling list 47. This results in round-robin servicing of input queues 26 on a particular scheduling list 47. FIG. 3 illustrates the structure of a scheduling list 47.

When a data cell 22 is received at an input port processor 14, the first action performed by the input port processor 14 is to check the header of the data cell for errors and then to check that the data cell is associated with a valid connection. Cell header integrity is verified by computing a Header Error Check (HEC) on bytes in the header of a received data cell and then comparing the computed HEC to the HEC field in the header of the received data cell. If the computed HEC and the HEC field do not match, then there is a header error and the data cell will be dropped.

For each incoming data cell, an input port processor 14 will use VPI/VCI fields specified in the header of the data cell as an index into a translation table in the input port processor 14. The translation table correlates valid connections and input queue numbers. The input port processor 14 first checks to see if the data cell belongs to a valid connection; i.e. one that has been set up by switch control software. If the connection is valid, then the data cell will be assigned an input queue number from the translation table. If the connection is not valid, then the data cell will either be dropped or be assigned an exception input queue number from the translation table, which results in further processing of the data cell.

Figure 4:
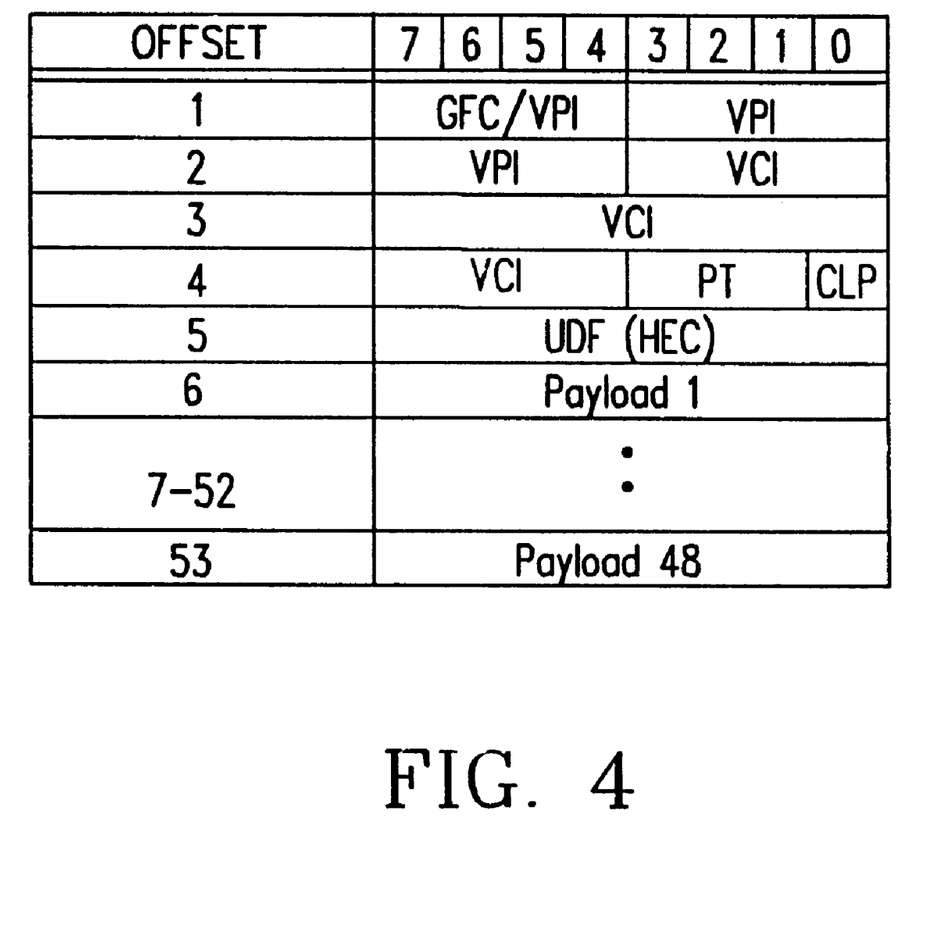
FIG. 4 shows the standard data bus format of a data cell.
Figure 5:
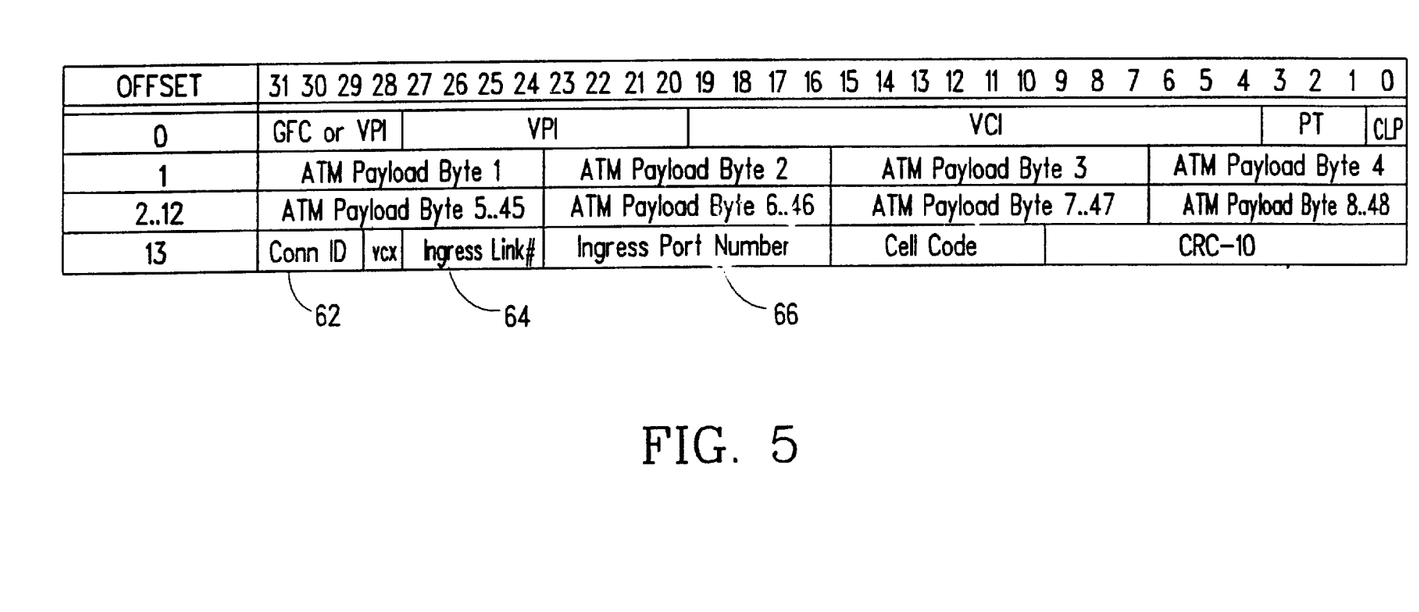
FIG. 5 shows the internal switch data cell format of a converted data cell.

While the data cell is being checked, it is converted from a standard data bus format into a internal switch data cell format. FIG. 4 shows the standard data bus format of a data cell. FIG. 5 shows the internal switch data cell format of a converted data cell.

Figure 6:
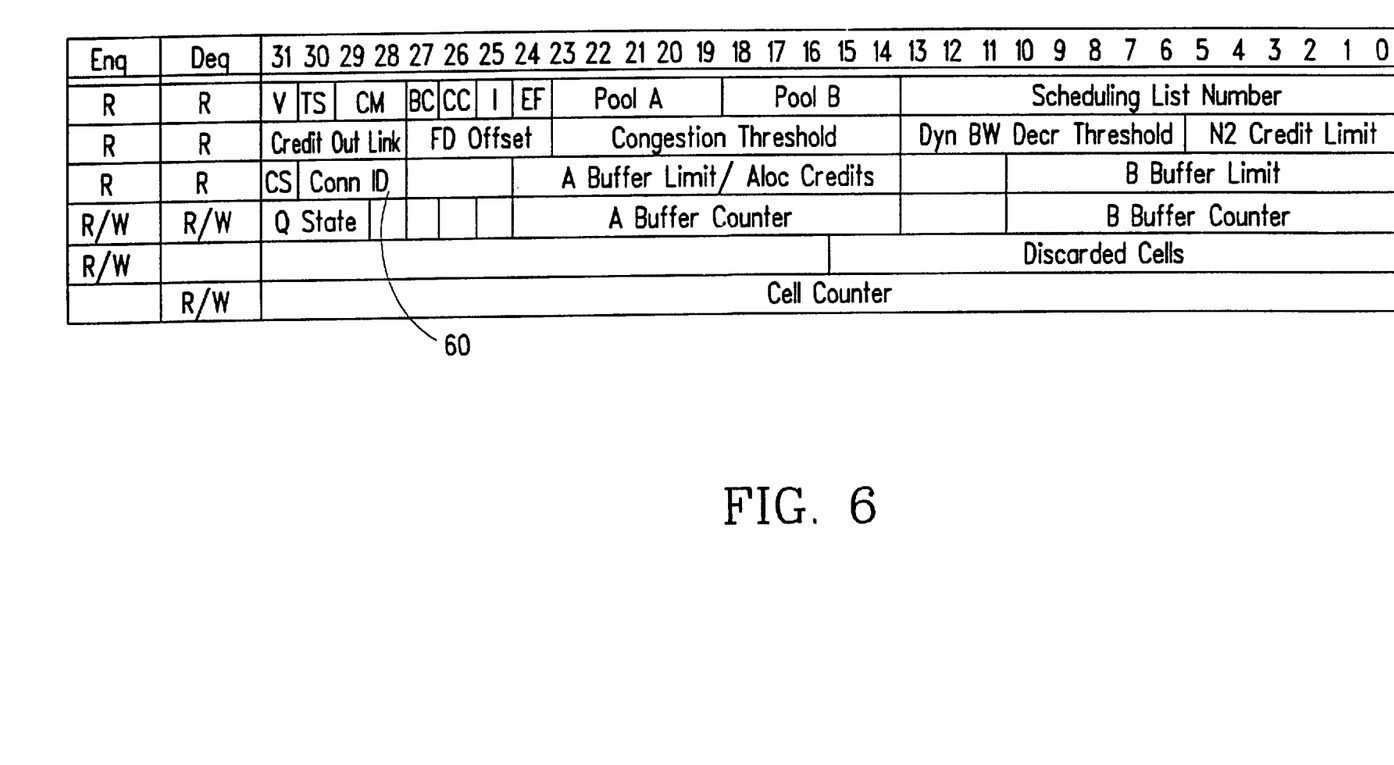
FIG. 6 shows the format of an input queue descriptor.
Figure 7:
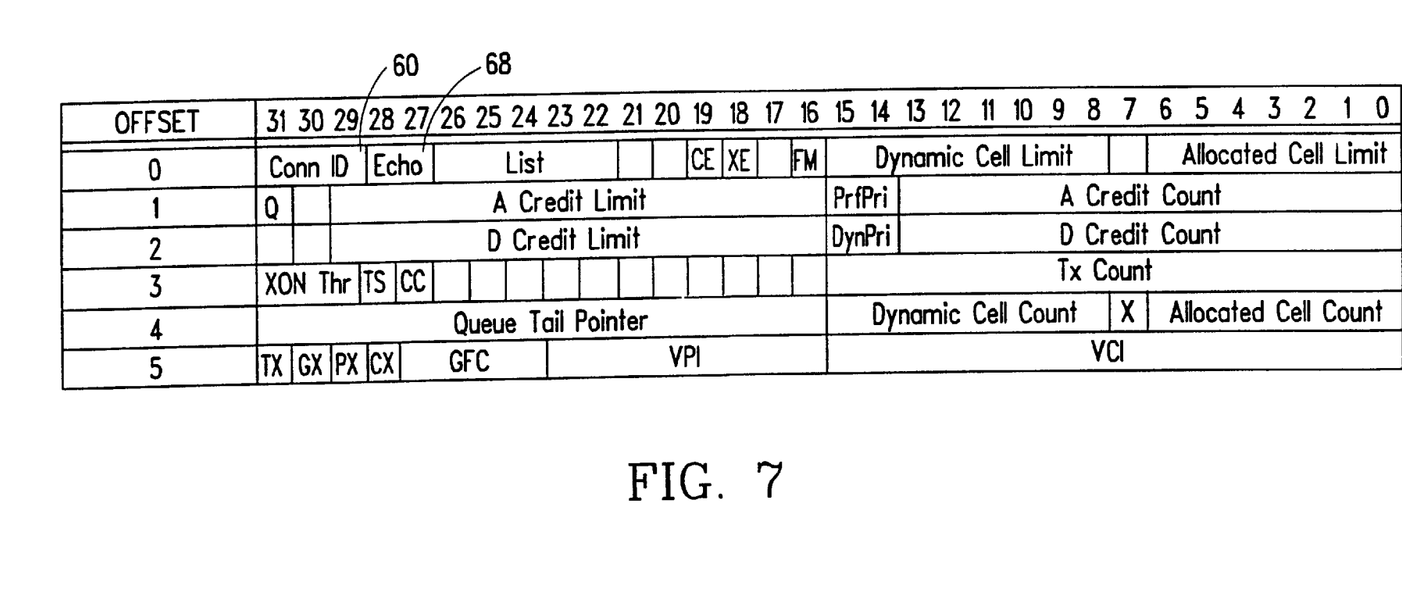
FIG. 7 shows the format of an output queue descriptor.

As previously described, an input queue number is used to point to a queue descriptor, which is a data structure containing state information that is unique to a particular connection. There is a queue descriptor for each queue in the switch 1; i.e. for both the input queues 26 in the input port processor 14 and the output queues 28 in the output port processor 16. The queue descriptors are maintained by switch control software. FIG. 6 shows the format of an input queue descriptor. FIG. 7 shows the format of an output queue descriptor.

After a data cell is assigned an input queue number, the input port processor 14 will look at the corresponding queue descriptor for further information on how to process the data cell. The input port processor 14 will first try to assign a buffer for the data cell. If a buffer is available, then the data cell buffer number is enqueued to the tail of the queue and the data cell is written out to the cell buffer RAM 32. If there is no buffer available, the data cell is dropped and a statistic is updated.

In addition to processing and buffering incoming streams of data cells, the input port processor 14 must transfer data cells from a cell buffer to one or more output port processors 16 through the Data Crossbar 10. The transfer of the data cells is performed through the use of the Probe Crossbar 20, the XOFF Crossbar 24, and the Data Crossbar 10, as previously described. Specifically, a multiqueue number, which is derived from information provided to an MTC 18 from a scheduling list 47 in an input port processor 14, is transmitted from the MTC 18 to one or more output port processors 16 using the Probe Crossbar 42. Each output port processor 16 then tests for buffer availability and asserts a "DO NOT SEND" type feedback message through the XOFF Crossbar 44 if output buffering is not available for that connection. If output buffering is available for that connection, the input port processor 14 transmits a data cell to one or more output queues 28 through the Data Crossbar 10. However, before any data cells are enqueued into any output queue 28, the output port processor 16 processes each data cell based on information contained in the trailer of the converted data cell.

Referring particularly to FIGS. 6 and 7, the input queue descriptor and the output queue descriptor both include a connection identification (Conn ID) field 60. This field 60 contains an arbitrary code that is assigned by the switch control software indicating 1 of 8 possible data flow paths upon which to perform a cell mask. When processing a data cell, an input port processor 14 will insert the code from the connection identification field 60 of the input queue descriptor into a similar connection identification (Conn ID) field 62 in the converted data cell (see FIG. 6). The converted data cell also includes an ingress port number field 64, indicating the number of the input port processor 14 where the data cell 22 was received, and an ingress link number field 66, indicating the number of the input link 24 that the data cell 22 arrived on. Note that the output queue descriptor also contains an "echo" field 68 for a 2-bit code which indicates what action that an output port processor 16 should take when processing a data cell transmitted from an input port processor 14, as will be described in detail below. The code in the echo field 68 is also assigned by the switch control software.

For every data cell transmitted from an input port processor 14, an output port processor 16 processes the data cell by comparing its own port number, link number, and connection identification code to the port number, link number, and connection identification code of the converted data cell. In conjunction with the 2-bit code in the echo field 68 of the output queue descriptor, this comparison is used to decide whether or not to enqueue the data cell arriving at a corresponding output queue 28.

Figure 8:
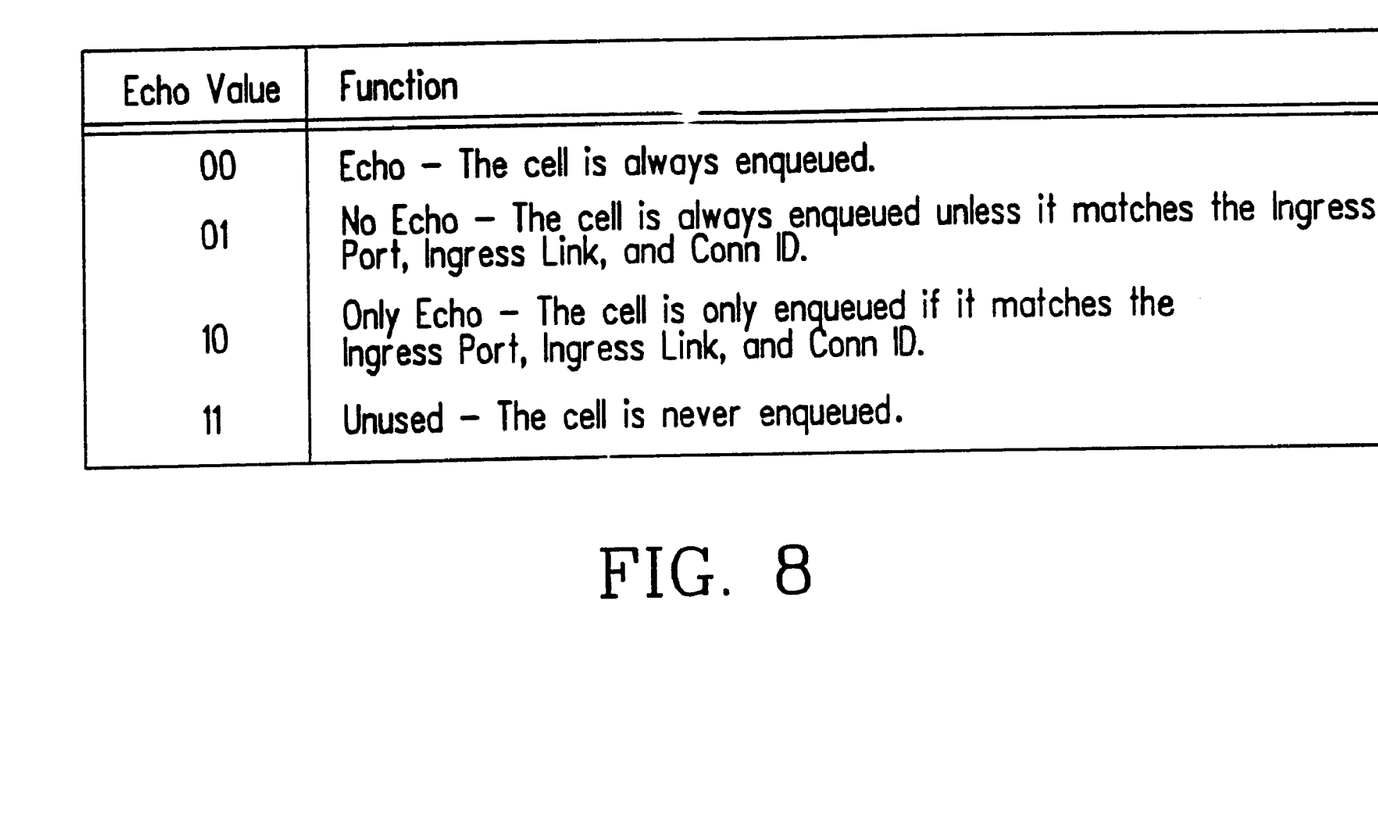
FIG. 8 contains a table indicating the different echo field codes and the corresponding output port processor functions associated with those codes.

Referring to FIG. 8, there is shown a table indicating the different echo field codes and the corresponding output port processor functions associated with those codes. For example, if the echo field 68 in the output queue descriptor is set to "00", the output port processor 16 will always enqueue the data cell. In contrast, if the echo field 68 in the output queue descriptor is set to "11", the output port processor 16 will never enqueue the data cell. More importantly, however, are the actions of the output port processor 16 when the echo field 68 in the output queue descriptor is set to "01" or "10". More specifically, echo processing of data cells received by an output port processor 16 conserves resources in the switch 1 in a multipoint-to-multipoint switching scenario.

To illustrate the aforementioned conservation of switching resources in a multipoint-to-multipoint switching scenario, it must be understood that a switch 1 is often used within a network of similar switches wherein data cells are routed through the network. In a multipoint-to-multipoint switching scenario, data cells from a variety of sources are transferred from multiple input queues 26 to multiple output queues 28 within a switch 1. In such a scenario, it is often beneficial to eliminate duplicate processing of data cells or to otherwise prevent the flow of certain data cells through a switch 1 so as to free up valuable switching resources. Echo processing of data cells received by an output port processor 16 achieves this objective by essentially screening converted data cells according to the port number, link number, and connection identification code contained in the converted data cells.

When the echo field 68 in the output queue descriptor is set to "01", a "No Echo" situation, the output port processor 16 will always enqueue the data cell unless the port number, the link number, and the connection identification code of the data cell match the port number, link number, and connection identification code of the output port processor 16. Alternatively, when the echo field 68 in the output queue descriptor is set to "10", an "Only Echo" situation, the output port processor 16 will enqueue the data cell only if the port number, the link number, and the connection identification code of the data cell match the port number, link number, and connection identification code of the output port processor 16.

Figure 9:
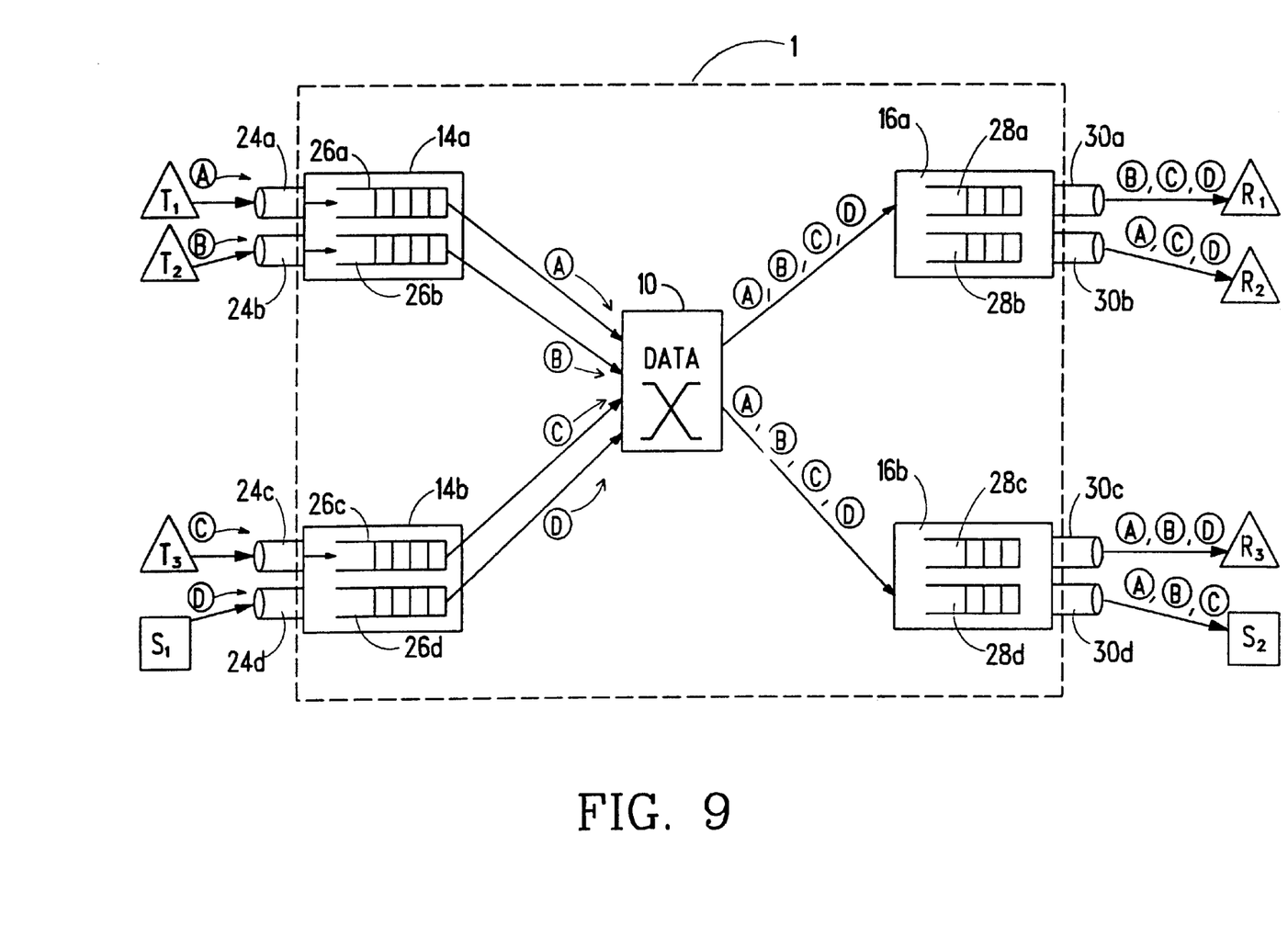
FIG. 9 shows a "No Echo" multipoint-to-multipoint switching scenario.

Referring to FIG. 9, there is shown an example of a "No Echo" multipoint-to-multipoint switching scenario, wherein a plurality of data cells (A, B, C, and D) are being transmitted from a corresponding plurality of sources (T1, T2, T3, and S1) to a plurality of destinations (R1, R2, R3, and S2). More specifically, T1, T2, and T3 denote end station transmitters, R1, R2, and R3 denote end station receivers, and S1 and S2 denote other switching elements within a network. The data cells are received by input port processors 14a and 14b, where they are processed and enqueued in input queues 26a, 26b, 26c, and 26d. Input port processor 14a and output port processor 16a have the same port number, and input port processor 14b and output port processor 16b have the same port number. Links 24a, 24c, 30a, and 30c all have the same link number, and links 24b, 24d, 30b, and 30d all have the same link number. All of the input queues 26 and output queues 28 have been assigned an arbitrary connection identification code of 6.

As previously described, the processing of the data cells includes amending the trailer in each data cell to include an arbitrary connection identification code, a link number, and a port number. In this particular example, data cell A is assigned an arbitrary connection identification code of 6, a link number of 24a, and a port number of 14a. Similarly, data cell B has been assigned an arbitrary connection identification code of 6, a link number of 24b, and a port number of 14a, data cell C has been assigned an arbitrary connection identification code of 6, a link number of 24c, and a port number of 14b; data cell D has been assigned an arbitrary connection identification code of 6, a link number of 24d, and a port number of 14b. For each data cell, multiqueue numbers are transmitted simultaneously to the output port processors 16a and 16b, whereby each output port processor 16a and 16b tests for buffer availability, i.e. output port processor 16a tests output queues 28a and 28b for buffer availability, and output port processor 16b tests output queues 28c and 28d for buffer availability. If sufficient buffering is available, the data cells are then transmitted through the Data Crossbar 10 and the data cells are processed by the corresponding output port processors 16a and 16b.

In the "No Echo" scenario, the output port processors 16a and 16b will enqueue the data cells unless the port number, the link number, and the connection identification code of the data cells match the port number, link number, and connection identification code of the output port processors 16a and 16b. Thus, output queue 28a will enqueue data cells B, C, and D, output queue 28b will enqueue data cells A, C, and D, output queue 28c will enqueue data cells A, B, and D, and output queue 28d will enqueue data cells A, B, and C.

Connection identification codes provide another control to screen sources or destinations from transmitting or receiving, respectively. This augments the physical port and link number screening.

As illustrated above, echo processing allows each output queue 28a–d to receive data cells from a different set of sources while utilizing a single set connection resources, namely input queues 26a–d, scheduling lists 47, and output queues 28a–d. Echo processing thus allows valuable switching resources to become unencumbered in a network switch involved in a multipoint-to-multipoint switching scenario.

It will be understood that various changes and modifications to the above described method and apparatus may be made without departing from the inventive concepts disclosed herein. Accordingly, the present invention is not to be viewed as limited to the embodiment described herein.

What is claimed is:

1. A method for unencumbering valuable switching resources in a network switch, wherein said network switch has an input processing port and an output processing port connected to a plurality of links and having a plurality of data buffering queues, wherein each of said data buffering queues has a connection identification code, and wherein said data buffering queues in said output processing port have a data cell processing code, said method comprising the steps of:

receiving a data cell at an output processing port, said data cell containing a link number indicating an input link where said data cell arrived, a port number indicating an input processing port where said data cell was received, and a connection identification code associated with a data buffering queue in said input processing port where said data cell was buffered;

comparing said link number to a link number of a link connected to said output processing port, said port number to a port number of said output processing port, and said connection identification code to a connection identification code associated with a data buffering queue in said output processing port; and storing said data cell in said data buffering queue in said output processing port according to a matching scheme between said link numbers, said port numbers, and said connection identification codes as dictated by the value of said data cell processing code.

2. The method as defined in claim 1, wherein said matching scheme requires that said link numbers, said port numbers, and said connection identification codes match in order for said data cell to be stored in said data buffering queue.

3. The method as defined in claim 1, wherein said matching scheme requires that said link numbers, said port numbers, and said connection identification codes do not match in order for said data cell to be stored in said data buffering queue.

4. A method for unencumbering valuable switching resources in a network switch, wherein said network switch has an input processing port and an output processing port connected to a plurality of links and having a plurality of data buffering queues, wherein each of said data buffering queues has a connection identification code, and wherein said data buffering queues in said output processing port have a data cell processing code, said method comprising the steps of:

receiving a data cell at an output processing port, said data cell containing a link number indicating an input link where said data cell arrived, a port number indicating an input processing port where said data cell was received, and a connection identification code associated with a data buffering queue in said input processing port where said data cell was buffered; and processing said data cell according to a matching scheme, as dictated by the value of said data cell processing code, between said link number and a link number of a link connected to said output processing port, said port number and a port number of said output processing port, and said connection identification code and a connection identification code associated with a data buffering queue in said output processing port.

5. The method as defined in claim 4, wherein said step of processing said data cell comprises storing said data cell in said data buffering queue in said output processing port when said link numbers, said port numbers, and said connection identification codes match.

6. The method as defined in claim 4, wherein said step of processing said data cell comprises storing said data cell in said data buffering queue in said output processing port when said link numbers, said port numbers, and said connection identification codes do not match.

7. A network switch that is capable of unencumbering valuable switching resources within the network switch, said network switch comprising:

a switch fabric;

an input processing port connected between a plurality of input links and said switch fabric and having a plurality of data buffering queues, wherein each of said data buffering queues has a connection identification code, wherein said input processing port processes a data cell received on one of said plurality of input links by appending to said data cell a link number indicating an input link where said data cell arrived, a port number indicating said input processing port, and a connection identification code associated with a data buffering queue in said input processing port where said data cell will be buffered; and an output processing port connected between said switch fabric and a plurality of output links and having a plurality of data buffering queues, wherein each of said data buffering queues has a connection identification code, wherein said data buffering queues in said output processing port have a data cell processing code, wherein said output processing port processes a data cell processed by said input processing port and transferred to said output processing port through said switch fabric by comparing said link number to a link number of a link connected to said output processing port, said port number to a port number of said output processing port, and said connection identification code to a connection identification code associated with a data buffering queue in said output processing port, and then storing said data cell in said data buffering queue in said output processing port according to a matching scheme between said link numbers, said port numbers, and said connection identification codes as dictated by the value of said data cell processing code.

8. The network switch as defined in claim 7, wherein said output processing port matching scheme requires that said link numbers, said port numbers, and said connection identification codes match in order for said data cell to be stored in said data buffering queue.

9. The network switch as defined in claim 7, wherein said output processing port matching scheme requires that said link numbers, said port numbers, and said connection identification codes do not match in order for said data cell to be stored in said data buffering queue.

* * * * *